(12) United States Patent
Poussin

(10) Patent No.: US 6,945,409 B2
(45) Date of Patent: Sep. 20, 2005

(54) DEVICE FOR DE-DUSTING PARTICLES ASSOCIATED WITH A LOADING UNIT AND ITS USE

(75) Inventor: Bernard Poussin, Carrieres sur Seine (FR)

(73) Assignee: Institut Francais Du Petrole, Rueil-Malmaison Cedex (FR)

( * ) Notice: Subject to any disclaimer, the term of this patent is extended or adjusted under 35 U.S.C. 154(b) by 241 days.

(21) Appl. No.: 10/371,160

(22) Filed: Feb. 24, 2003

(65) Prior Publication Data

US 2003/0178347 A1 Sep. 25, 2003

(30) Foreign Application Priority Data

Feb. 22, 2002 (FR) .............................................. 02 02318
Feb. 5, 2003 (FR) .............................................. 03 01314

(51) Int. Cl.⁷ ............................................... B03B 5/74
(52) U.S. Cl. ............................ 209/444; 209/453; 141/8
(58) Field of Search ................................ 141/8, 65, 93; 209/142, 144, 453

(56) References Cited

U.S. PATENT DOCUMENTS 6,443,193 B1 * 9/2002 Blasco ........................ 141/286

FOREIGN PATENT DOCUMENTS

| DE | 8812734 | 12/1988 |
|----|---------|---------|
| FR | 2175976 | 10/1973 |
| FR | 2629064 | 9/1989 |
| FR | 2766386 | 1/1999 |

* cited by examiner

*Primary Examiner*—Donald P. Walsh
*Assistant Examiner*—Kaitlin Joerger
(74) *Attorney, Agent, or Firm*—Millen, White, Zelano, Branigan, P.C.

(57) ABSTRACT

A device for de-dusting, i.e., removing dust, from a particle flow in an enclosure. The device is optionally associated with a unit for dense loads which supplies the particle flow. The device is useful, for example, for removing dust from catalyst particle flows and from adsorbent particle flows. It is also useful for removing dust from grain or cereal particles, for example, being supplied to a silo.

24 Claims, 1 Drawing Sheet

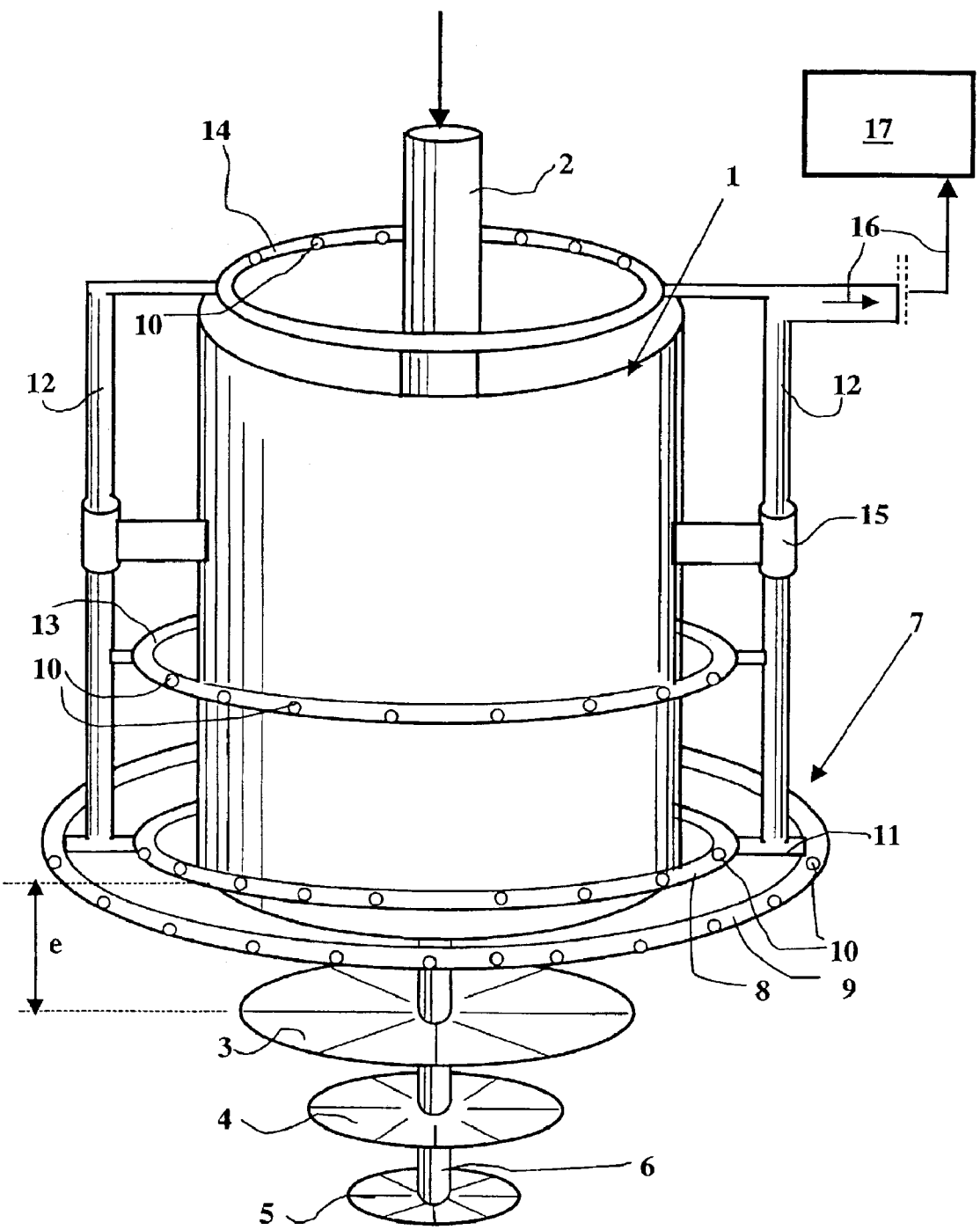

DEVICE FOR DE-DUSTING PARTICLES ASSOCIATED WITH A LOADING UNIT AND ITS USE

The invention relates to a device for de-dusting a flow of particles combined with a dense load unit supplying, in an enclosure, these particles associated with the dust and its use.

It relates in particular to de-dusting during loading of all catalytic particles and all types of absorbents, zeolitic or not, in the form of globules, rods, or extruded bits that are loaded in a chemical reactor, as well as grains and cereals filling silos, which also contain dusts.

Currently, reactors are loaded without taking special measures relating to the removal of the dust associated with the particles during loading operations. Generally a rigid sleeve connected to an evacuation device is introduced into the reactor to eliminate the dust suspended in the atmosphere of the reactor before any inspection by a loading operator. This has the object of making the atmosphere more breathable and the work of the operator safer. This operation makes it possible to extract, in a timely way, part of the "fine particles" in suspension. When it is decided to put an evacuation sleeve into the reactor, during loading, if it is desired to increase the efficiency of this operation, there is a risk of removing more catalyst than dust, and thus of increasing the cost price of the catalyst.

Moreover, with a dense load, the projection of the particles must be directed and perfectly distributed; the creation of a violent and localized air flow will perturb the distribution of the particles and induce bad dense loading.

In fact, most of the dust associated with catalytic particles is trapped in the bed during loading, becomes attached to the walls of the reactor and is deposited on internals parts, in the bed, and on the various plate elements outside the catalytic bed.

The catalytic bed thus loaded with particles of smaller size in the form of globules or extruded bits acts like a filter. When the reactor is operating and over the life of the catalyst, the dust associated with fragments and with particles contained in the catalyst migrates into the intergranular spaces, progressively clogs these spaces and perturbs the distribution of fluids inside the reactor. This phenomenon can cause the formation of a cake partially or totally occupying the bed section. It follows that the bed only partially fulfills its function because it is working poorly or only a little.

Further, it causes additional load losses more or less over the long term.

The object of the invention is to solve the drawbacks mentioned above. More specifically, the invention relates to a device for de-dusting a flow of particles associated with a dense load unit comprising a core (1) and at least one means (3) for a rotating dispersion of the particles below the core, said unit sending said particles and dust into an enclosure in a generally downward direction, said device being characterized in that it comprises:
- at least one lower chamber containing at least one opening, surrounding the dense load unit, placed at the level of the lower part of said unit,
- at least one dust collection and support tube connected to the chamber,
- at least one means of attaching the device to the loading unit,
- at least one means of evacuating the dust associated with the particles, comprising a means of storing the dust, connected to the collection and support tube, in which lower chamber (9) is located above the lower end of the core at a distance less than at least 10 times the distance between the core and the dispersion means, calculated along a vertical plane and in which the openings of the lower chamber face the periphery.

For example, the lower chamber is located above the lower end of the core at a distance less than the distance between the core and the dispersion means.

The combination such as it was just described of the dense load unit and the de-dusting device is the basis of a synergistic effect making it possible simultaneously to:
- maintain a high rate of de-dusting of the particle flow,
- not generate perturbations in the distribution of particles in the reactor,
- minimize the risks of carrying particles into the de-dusting device.

It has in fact been found by the applicant that it was possible to resolve the complex technical problem that was just described by a design such as described and making it possible notably to place the de-dusting means as close as possible to the loading means so as to benefit from the dispersion of particles created by using said loading means to evacuate the just-released dust. Such a design further makes it possible to limit the risks of carrying particles along since the openings of the lower chamber face the periphery and then one evacuation of only a limited intensity is needed to perform said de-dusting.

According to an advantageous embodiment of the invention, the attachment means are also a means of guiding the lower chamber between the lower end and upper end of the core. Such an arrangement makes it possible to have greater flexibility because of the possibility of adjusting the distance between the lower chamber and the dispersion means. According to this embodiment, it is possible to optimize the operation of the device depending on the given parameters, such as the size of the particles, the desired de-dusting rate, evacuation intensity, etc.

The lower chamber advantageously surrounds the unit and preferably comprises numerous openings.

Under these conditions, by removing the dust contained in the catalyst or the absorbent, right before they are loaded into the reactor, it was confirmed that better productivity of the catalyst or of the absorbent results, and the load losses are reduced to the maximum, for example less than at least 15% compared to those observed before use of the device according to the invention and, for example, less than 15 to 30%.

Further, the loading operation is safer and the loss of active particles is minimized.

According to a preferred characteristic of the de-dusting device, the lower chamber surrounds the unit for the particle-dense load, which can be approximately cylindrical. Any other shape, with an oval section for example, can also be suitable.

According to an advantageous characteristic, the device can further comprise at least one upper chamber perforated with openings located at the level of the upper part of the loading unit or above the unit and preferably above the internal zone of the unit.

This upper chamber and the lower chamber can be ring-shaped. They can be connected to at least two approximately vertical collection and support elements that connect them. These collection elements are preferably attached to the dense load unit by attachment means that can also be elements for guidance in an approximately vertical direction.

The dust collection and support elements are advantageously tubular.

According to one characteristic of the invention, the dense load unit can comprise a core and at least one means for rotating dispersion of the particles below the core, and the lower chamber is located above the lower end of the core, at a distance less than 10 times distance (e) between the core and the dispersion means, calculated along a vertical plane.

Preferably, it can be less than 5 times the distance between the core and the dispersion means. Dispersion means is understood as the first dispersion stage when there are numerous particles coming from the core of the unit and falling on this first stage.

Thus several lower chambers can be used along a vertical plane above the core. They can be located at a distance from the lower end of the core that is less than 10 times said distance (e).

According to another characteristic, the lower chamber can be located at a distance from the core in a horizontal plane between 0.25 and 15 times the distance between the core and the particle dispersion means, preferably 1 to 5 times.

The lower and upper chambers, usually ring-shaped, can have a section of any shape but preferably a circular section. They can also comprise one or several levels of openings, preferably several levels. Those of the lower chamber advantageously face the periphery.

It is preferable that the upper chamber be located above the internal zone of the dense load unit, with one or several levels of openings usually facing the center of the unit.

Good results were obtained when the upper chamber was located at a distance between 0 and 7 times the distance from the core to the particle dispersion means.

The number and the section of the openings of the lower chamber or chambers and of the upper chamber when it is present will be determined such that the sum of the sections of these openings is less than the section of the collection and support tube or than the sum of the sections of the collection and support tubes when there are at least two of them.

Further, the size of these openings can be less than, equal to, or greater than the granulometry of the particles.

The invention will be better understood with reference to the drawing that diagrammatically illustrates the de-dusting device associated with a particle-dense load unit in an enclosure.

According to this drawing, the dense load unit comprises a core 1, cylindrical, connected by a sleeve 2 to a hopper, not represented in the drawing, which contains catalytic particles.

A group of dispersion plates 3, 4, 5 of decreasing size going downward pivots around an axle 6 that is mobile due to a motor not represented in the drawing, and disperses the particles into a reactive enclosure in a homogeneous manner. This unit is described, for example, in patent EP-B-482,991 of the applicant.

A device 7 for de-dusting the catalytic dust, combined with the loading unit, comprises in the drawing two ring-shaped lower chambers 8, 9 with circular section that surround the unit. They are placed above the lower end of the core at a distance less than distance e, for example, 0.5 times distance e that separates the lower end of the core and first plate 3. In a horizontal plane, first chamber 8 is at a distance from the core equal to once distance e while second chamber 9 is at a distance from the core equal to twice distance e, for example. These chambers are perforated by openings 10 facing the periphery and oriented upward and/or downward.

The lower chambers are connected by two joining elements 11, for example diametrically opposite, and are connected to at least two collection and support tubes 12, cylindrical and approximately vertical. These tubes also provide connection with another lower chamber 13, perforated with openings 10 facing the periphery. Chamber 13 is located at a distance 1.5 times distance e mentioned. Collection and support tubes 12 are also connected to an upper chamber 14, ring-shaped, located at a distance equal to 0.5 times distance e from the core to the first dispersion plate, above the upper end of the core. Chamber 14 is preferably located above the internal zone of the dense load unit. It has a more reduced volume than that of the lower chamber and has a 3 to 4 times fewer number of openings, for example, located advantageously toward the inside.

The lower chambers can be topped by a hood (not represented in the drawing) surrounding the particle loading unit, the lowest, external peripheral part being located preferably about at the level of the lower end of the core. The dusts are thus concentrated in the volume thus created and their extraction is facilitated.

The collection tubes are attached to core 1 of the loading unit by two attachment elements 15 that hold the de-dusting device. Attachment elements 15 also have a function of guiding the device to an appropriate height of the lower and upper chambers with respect to the lower end and the upper end of the core, respectively. The dust collection tubes coming from the lower and upper chambers are connected by a flexible part 16 to an industrial vacuum 17 that evacuates and stores the catalytic dusts.

Throughout the loading operation, the catalyst loading unit and the de-dusting device according to the invention to which it is attached can be suspended by a suitable means to the inlet collar of the reactive enclosure, notably when this enclosure has only one catalytic bed. Optionally the collection tubes can simultaneously transport the dusts and support the unit on the inlet collars of the enclosure.

When the enclosure has several catalytic beds, the loading unit and the de-dusting device can be supported during loading by the fluid distribution plate located in the enclosure and corresponding to each catalytic bed.

The preceding examples can be repeated with similar success by substituting the generically or specifically described reactants and/or operating conditions of this invention for those used in the preceding examples.

The entire disclosures of all applications, patents and publications, cited herein and of corresponding French application No. 02/02.318, filed Feb. 22, 2002, and French application No. 03/01.314, filed Feb. 5, 2003, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A device for de-dusting a flow of particles, which is useful in association with a dense load unit, the dense load unit comprising a means for loading the flow of particles into a core enclosure (1) in a downward direction and at least one means (3) for rotatively dispersing the particles below the core, wherein the device for de-dusting comprises:
   at least one lower hollow chamber (9) containing multiple openings (10), the chamber being arranged such that, when the device is associated with the dense load unit, the chamber surrounds the outside of the core enclosure (1) at its lower end but above the bottom of the core enclosure at a distance which is less than 10 times the distance between the bottom of the core enclosure and the top of the dispersing means (3), calculated along a vertical plane, and such that the openings (10) face away from the core enclosure, at least one hollow collection and support tube (12) connected to the chamber (9), and at least one evacuating means (17) for evacuating the dust associated with the particles, comprising a means of storing the dust, connected to the collection and support tube (12), wherein the evacuating means is in evacuating communication with the hollow collection and support tube (12), and the hollow collection and support tube (12) is in evacuating communication with the hollow chamber (9), such that an evacuating effect can be achieved through the openings (10) of the chamber (9).

2. A device according to claim 1, wherein lower chamber (9) is located above the bottom of the core enclosure a distance which is less than the distance between the bottom of the core and the top of the dispersing means.

3. A device according to claim 2, wherein the device is capable of being associated with a dense load unit which has an approximately cylindrical core enclosure and said lower chamber circularly surrounds said core enclosure when so associated.

4. A device according to claim 2, wherein the device is capable of being associated with a dense load unit which has an approximately cylindrical core enclosure and said lower chamber circularly surrounds said core enclosure when so associated.

5. A device according to claim 2, further comprising at least one means (15) for attaching the device to a dense load unit.

6. A device according to claim 5, wherein attachment means (15) is also a means of guiding lower chamber (9) between the lower end and the upper end of the core enclosure (1).

7. A device according to claim 5, wherein the device is capable of being associated with a dense load unit which has an approximately cylindrical core enclosure and said lower chamber circularly surrounds said core enclosure when so associated.

8. A device according to claim 1, further comprising an additional hollow lower chamber perforated with multiple openings (10), placed at approximately the same vertical level as the lower chamber (9) but outside of lower chamber (9), wherein the additional hollow lower chamber is in evacuating communication with the evacuating means (17) through the hollow collection and support tube (12), such that an evacuating effect can be achieved through the openings (10) of the additional lower chamber.

9. A device according to claim 1, further comprising at least one means (15) for attaching the device to a dense load unit.

10. A device according to claim 9, wherein attachment means (15) is also a means of guiding lower chamber (9) between the lower end and the upper end of the core enclosure (1).

11. A device according to claim 1, wherein the device is capable of being associated with a dense load unit which has an approximately cylindrical core enclosure and said lower chamber circularly surrounds said core enclosure when so associated.

12. A device according to claim 1, further comprising at least one hollow upper chamber (14) perforated with multiple openings (10), which, when the device is associated with the dense load unit, is placed approximately at the level of the upper end of said dense load unit or above the upper end of said dense load unit and wherein the hollow upper chamber is in evacuating communication with the evacuating means (17) through the hollow collection and support tube (12), such that an evacuating effect can be achieved through the openings (10) of the chamber (14).

13. A device according to claim 12, further comprising at least one hollow intermediate chamber (13) perforated with multiple openings (10) placed, vertically, between the lower chamber (9) and the upper chamber (14), which intermediate chamber, when the device is associated with the dense load unit, surrounds the outside of the core enclosure (1), and wherein the hollow intermediate chamber is in evacuating communication with the evacuating means (17) through the hollow collection and support tube (12), such that an evacuating effect can be achieved through the openings (10) of the chamber (13).

14. A device according to claim 12, wherein the multiple openings of the upper chamber face inwards.

15. A device according to claim 12, wherein, when the device is associated with the dense load unit, said at least one upper chamber is located above the upper end of the dense load unit and within the circumference extended above the upper end of the core enclosure.

16. A device according to claim 15, wherein said at least one upper chamber is located at a vertical distance above the upper end of the dense load unit which is between 0 and 7 times the distance from the bottom of the core enclosure to the top of the particle dispersing means.

17. A device according to claim 12, wherein said at least one upper chamber and said at least one lower chamber are connected to at least two collection and support tubes that have attachment means for attaching to the dense load unit.

18. A device according to claim 17, wherein, when the device is associated with the dense load unit, said at least one lower chamber is located at a distance from the outside of the core enclosure in a horizontal plane between 0.25 and 15 times the distance between the bottom of the core enclosure and the top of the particle dispersing means.

19. A device according to claim 12, wherein said at least one lower chamber and said at least one upper chamber are ring-shaped.

20. A device according to claim 19, wherein said at least one upper chamber and said at least one lower chamber are connected to at least two collection and support tubes that have attachment means for attaching to the dense load unit.

21. A device according to claim 19, wherein, when the device is associated with the dense load unit, said at least one lower chamber is located at a distance from the outside of the core enclosure in a horizontal plane between 0.25 and 15 times the distance between the bottom of the core enclosure and the top of the particle dispersing means.

22. An apparatus comprising a dense load unit and a de-dusting device, said dense load unit comprising a means for loading a flow of particles into a core enclosure (1) in a downward direction and at least one means (3) for rotatively dispersing the particles below said core, and said de-dusting device comprising at least one lower hollow chamber (9) containing multiple openings (10), the chamber being arranged such that it surrounds the outside of the core enclosure (1) at its lower end but above the bottom of the core enclosure at a distance which is less than 10 times the distance between the bottom of the core enclosure and the top of the dispersing means (3), calculated along a vertical plane, and such that the openings (10) face away from the core enclosure, at least one hollow collection and support tube (12) connected to the chamber (9), at least one means (15) for attaching the de-dusting device to the dense load unit, at least one evacuating means (17) for evacuating the dust associated with the particles, comprising a means of storing the dust, connected to the collection and support tube (12), wherein the evacuating means is in evacuating communication with the hollow collection and support tube (12), and the hollow collection and support tube (12) is in evacuating communication with the hollow chamber (9), such that an evacuating effect can be achieved through the openings (10) of the chamber (9).

23. A device according to claim 22, wherein the dispersing means (3) comprises multiple dispersion plates vertically arranged and decreasing in size downwardly.

24. A process for de-dusting a flow of absorbent, catalyst, grain or cereal particles, said process comprising loading particles of absorbent, catalyst, grain or cereal into a core enclosure of a dense load unit which is associated with a device according to claim 1 and evacuating the dust through the multiple openings (10) in the at least one lower hollow chamber (9).

\* \* \* \* \*